W. S. HUNT.
Carpet-Lining.
No. 223,047. Patented Dec. 30, 1879.
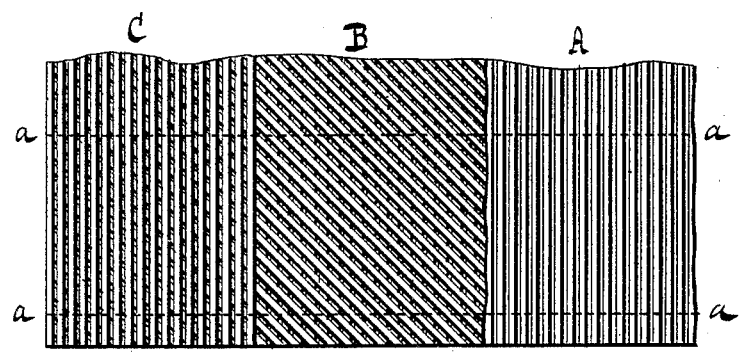
WITNESSES.
Warren R. Perce
Wm. B. M. Hallett
INVENTOR.
Walter S Hunt

UNITED STATES PATENT OFFICE.

WALTER S. HUNT, OF PROVIDENCE, RHODE ISLAND, ASSIGNOR OF ONE-HALF OF HIS RIGHT TO DAVID HUNT, OF SAME PLACE.

IMPROVEMENT IN CARPET-LININGS.

Specification forming part of Letters Patent No. 223,047, dated December 30, 1879; application filed July 25, 1879.

*To all whom it may concern:*

Be it known that I, WALTER S. HUNT, of the city and county of Providence, in the State of Rhode Island, have invented a new and useful Improvement in Carpet-Linings; and I declare the following to be a specification thereof, reference being had to the accompanying drawing.

The figure is a top view of my invention with the several layers exposed.

My invention is a new article of manufacture; and it consists of two or more layers of split straws, which layers are arranged diagonally to each other and quilted together to form a firm substantial fabric suitable for lining carpets.

The use of straw as a carpet-lining is preferable to cotton-batting or other paper-covered linings, because the dirt or dust, instead of lying upon the surface, to be ground into and wear the carpet, sifts through the open spaces between the straws and falls to the floor where it lies without injury to the carpet; but as hitherto used for this purpose the straw has been scattered loosely upon the floor, where it lies in irregular masses and remains in heaps until worn down by travel. By using it in the form of a quilted fabric it affords a smooth surface, upon which the carpet is evenly stretched, while by the diagonal arrangement of the several layers of straw, as described, the dirt and dust readily sift through the interstices to the floor.

I prefer to split the straws, that they may lie more compactly together.

In constructing the fabric I arrange the lower layer of straw transversely from side to side, as shown at A. Upon this I lay, diagonally thereto, the layer B, and upon the top I arrange the layer C transversely. These several layers are then stitched together at right angles with the top layer, as shown at *a a*.

Instead of having the upper and under layers disposed in the same direction the lower one may be spread diagonally also, but in a manner to cross diagonally the inner layer.

The inner layer, not being exposed to direct contact with the carpet, may be made of short or refuse stock; but the outer layers are best constructed of long and selected stock.

By quilting the layers together I obtain a fabric of sufficient body, firmness, and durability for the purpose desired, which can be removed from the floor, properly cleaned, and used repeatedly until actually worn out.

The number of layers may be indefinitely increased until any desirable thickness is obtained.

A great advantage resulting from the method of construction described is that this lining can be cut bias, or in any manner desired, to fit it to the room to be carpeted, and will retain its shape when so cut, and will present as firm and smooth an edge as when cut longitudinally.

I prefer the use of one or more diagonal layers, because they give increased elasticity to the fabric, making it soft to the tread; but I claim, as equally within my invention, the use of two or more layers of straw, rushes, flags, sedge, or the like, in whatever manner disposed relatively to each other, stitched together to form an unwoven matting.

I am aware that it is not new to weave together straw or other stalks to form a matting for carpet-lining and other purposes; but

I claim as a novel and useful invention, and desire to secure by Letters Patent—

1. As a new article of manufacture, two or more layers of straw stitched together to form a carpet-lining, substantially as described.

2. As a new article of manufacture, a carpet-lining consisting of two or more layers of straw, arranged diagonally to each other and stitched together, substantially as described.

WALTER S. HUNT.

Witnesses:
WARREN R. PERCE,
WM. B. W. HALLETT.